US009923216B2

(12) United States Patent
Kim et al.

(10) Patent No.: US 9,923,216 B2
(45) Date of Patent: Mar. 20, 2018

(54) HUMIDIFIER FOR FUEL CELL

(71) Applicant: HYUNDAI MOTOR COMPANY, Seoul (KR)

(72) Inventors: Hyun Yoo Kim, Seoul (KR); Hyuck Roul Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 15/196,958

(22) Filed: Jun. 29, 2016

(65) Prior Publication Data

US 2017/0149074 A1    May 25, 2017

(30) Foreign Application Priority Data

Nov. 20, 2015  (KR) .................. 10-2015-0162996

(51) Int. Cl.
| | |
|---|---|
| *H01M 8/04* | (2016.01) |
| *B01F 3/04* | (2006.01) |
| *H01M 8/04119* | (2016.01) |
| *B01D 53/00* | (2006.01) |
| *H01M 8/04007* | (2016.01) |
| *H01M 8/04082* | (2016.01) |
| *H01M 8/1018* | (2016.01) |

(52) U.S. Cl.
CPC ........ *H01M 8/04149* (2013.01); *B01D 53/00* (2013.01); *B01F 3/04* (2013.01); *H01M 8/04067* (2013.01); *H01M 8/04126* (2013.01); *H01M 8/04141* (2013.01); *H01M 8/04201* (2013.01); *H01M 2008/1095* (2013.01); *H01M 2250/20* (2013.01); *Y02T 90/32* (2013.01)

(58) Field of Classification Search
CPC . H01M 8/04126; H01M 8/04149; B01F 3/04; F24F 6/00; F24F 3/14
USPC .......................................... 261/152
See application file for complete search history.

(56) References Cited

U.S. PATENT DOCUMENTS

| | | | |
|---|---|---|---|
| 9,118,046 B2 * | 8/2015 | Kanazawa | ........ H01M 8/04126 |
| 2005/0280166 A1 | 12/2005 | Katagiri et al. | |
| 2006/0147774 A1 | 7/2006 | Suzuki et al. | |
| 2012/0094197 A1 | 4/2012 | Ko et al. | |

FOREIGN PATENT DOCUMENTS

| | | |
|---|---|---|
| EP | 2157379 A1 | 2/2010 |
| JP | 2000-090954 A | 3/2000 |
| JP | 2002-216816 A | 8/2002 |
| JP | 2006-339078 A | 12/2006 |
| JP | 2010-255701 A | 11/2010 |
| KR | 10-2009-0097982 A | 9/2009 |
| KR | 10-2011-0014455 A | 2/2011 |
| KR | 10-1459907 B1 | 11/2014 |
| KR | 10-2015-0056344 A | 5/2015 |
| KR | 10-2015-0072685 A | 6/2015 |

\* cited by examiner

*Primary Examiner* — Robert A Hopkins
(74) *Attorney, Agent, or Firm* — McDermott Will & Emery LLP

(57) ABSTRACT

A humidifier for a fuel cell includes a connection hose part connected to an air inlet of a fuel cell stack. A humidifier port part is coupled to an inner peripheral surface of the connection hose part and connects the connection hose part to an air outlet of a humidifier housing. A condensate collection part is coupled to an upper portion of the humidifier port part so that a condensate collection space is defined between an outer peripheral surface of the condensate collection part and the inner peripheral surface of the connection hose part.

11 Claims, 10 Drawing Sheets

HUMIDIFIER FOR FUEL CELL

CROSS-REFERENCE TO RELATED APPLICATION

This application claims under 35 U.S.C. § 119(a) the benefit of priority to Korean Patent Application No. 10-2015-0162996 filed on Nov. 20, 2015, the entire content of which is incorporated herein by reference.

TECHNICAL FIELD

The present disclosure relates to a humidifier for a fuel cell. More particularly, the present disclosure relates to a humidifier for a fuel cell, which is capable of collecting condensate generated due to a temperature difference between humidified air and outside air when the humidified air is supplied to a fuel cell stack.

BACKGROUND

In general, it is necessary to humidify a polymer electrolyte membrane in a fuel cell stack when operating the fuel cell stack. Accordingly, separate membrane humidifiers have been used for exchanging moisture between exhaust gas as wet gas discharged from fuel cell stacks and dry gas supplied from outside air.

Such humidifiers can be classified into bubbler type humidifiers, injection type humidifiers, and adsorbent type humidifiers. However, since fuel cell vehicles have limited packaging spaces, membrane humidifiers, which have relatively small volumes and do not need special power, are generally used. In particular, hollow fiber membrane humidifiers have been used as membrane humidifiers for fuel cells.

Here, a humidifier is typically located at a lower end of a fuel cell stack, in which the humidifier is clamped and connected to the fuel cell stack using a rubber hose or the like.

When air is humidified by the humidifier and supplied to the fuel cell stack, vapor is condensed due to a temperature difference between the humidified air and outside air. In this case, the condensed vapor flows down along a wall surface of the rubber hose, and is accumulated in the humidifier located at the lower end of the fuel cell stack.

Accordingly, when the condensed water is temporarily supplied to the fuel cell stack, the channel passage in the fuel cell stack may be clogged. In addition, if the condensed water freezes during the winter season, the humidification membrane in the humidifier may be damaged due to the volume expansion of water.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

An aspect of the present disclosure provides a humidifier for a fuel cell which defines a condensate collection space between a humidifier port and a connection hose, thus collecting condensate generated due to a temperature difference between the humidified air and outside air in the condensate collection space when air is humidified by the humidifier and supplied to a fuel cell stack According to an embodiment in the present disclosure, a humidifier for a fuel cell includes a connection hose part connected to an air inlet of a fuel cell stack. A humidifier port part is coupled to an inner peripheral surface of the connection hose part and connects the connection hose part to an air outlet of a humidifier housing. A condensate collection part is coupled to an upper portion of the humidifier port part so that a condensate collection space is defined between an outer peripheral surface of the condensate collection part and the inner peripheral surface of the connection hose part.

The condensate collection part may have the same inner diameter as the humidifier port part and may have a cylindrical shape in which upper and lower portions thereof have the same diameter.

The condensate collection part may have an inclination such that an area of the condensate collection space gradually increases upward from a bottom of the condensate collection part.

The humidifier port part may have a catch member formed on an inner peripheral surface of the humidifier port.

The condensate collection part may have a discharge hole formed therethrough.

The condensate collection space may have a heat transfer member formed on the inner peripheral surface of the connection hose part.

The connection hose part may be connected to the humidifier port part by clamping on the outer peripheral surface of the connection hose part.

According to another embodiment in the present disclosure, a humidifier for a fuel cell includes a humidifier port part connected to an air outlet of a humidifier housing. A connection hose part is coupled to an outer peripheral surface of the humidifier port part, connects the humidifier port part to an air inlet of a fuel cell stack, and has a bent end such that a condensate collection space is defined between an inner peripheral surface of the connection hose part and the outer peripheral surface of the humidifier port part.

According to a further embodiment in the present disclosure, a humidifier for a fuel cell includes a connection hose part connected to an air inlet of a fuel cell stack. A humidifier port part is coupled to an inner peripheral surface of the connection hose part and connects the connection hose part to an air outlet of a humidifier housing. A heat transfer member is coupled to an inner peripheral surface of the humidifier port part to evaporate condensate which moves along the inner peripheral surface of the humidifier port part.

The heat transfer member may be coupled to each of the inner peripheral surfaces of the connection hose part and the humidifier port part, or may be selectively coupled to the connection hose part or the humidifier port part.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus, are not limitative of the present disclosure.

Figure 1:
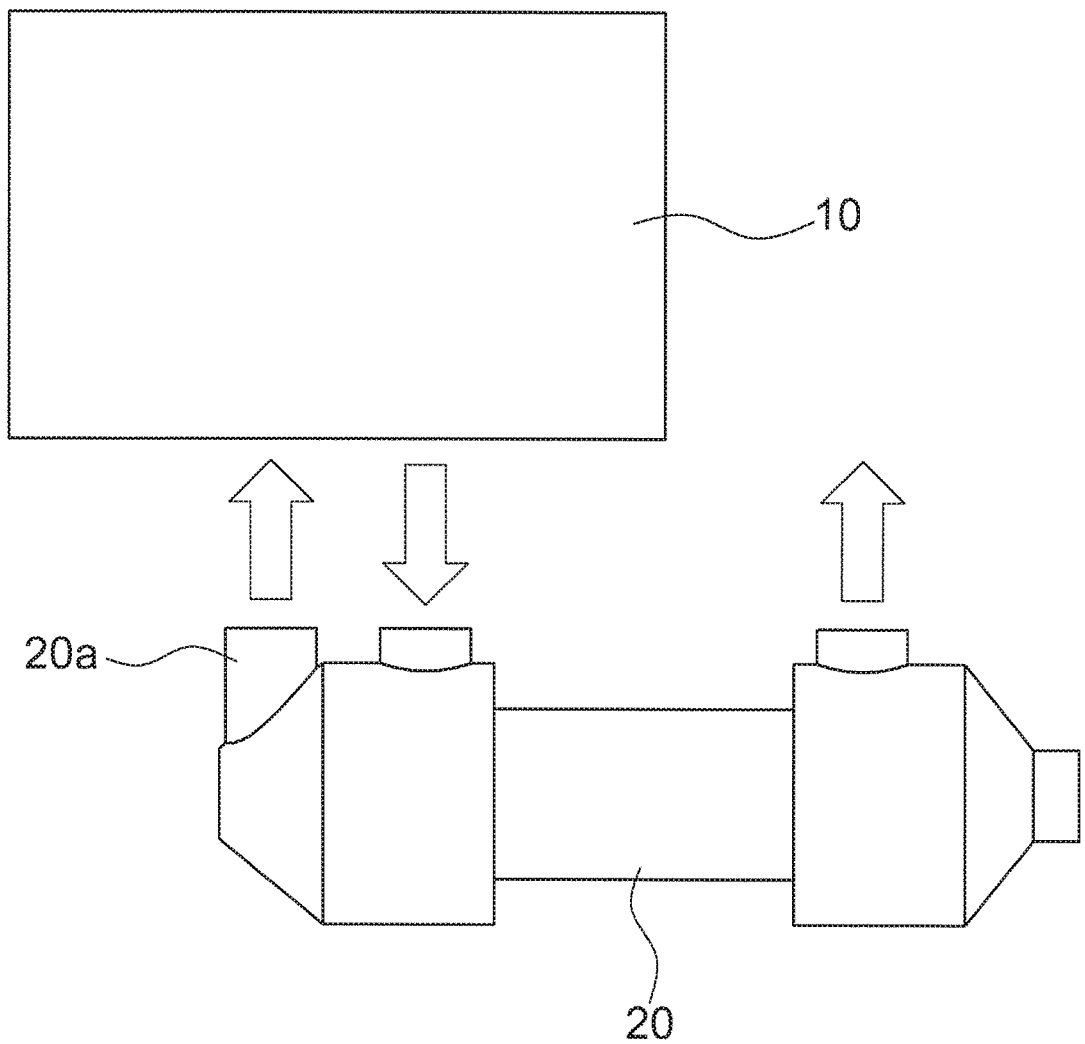
FIG. 1 is a view schematically illustrating connection between a fuel cell stack and a humidifier for a fuel cell according to a first embodiment in the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments in the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 2:
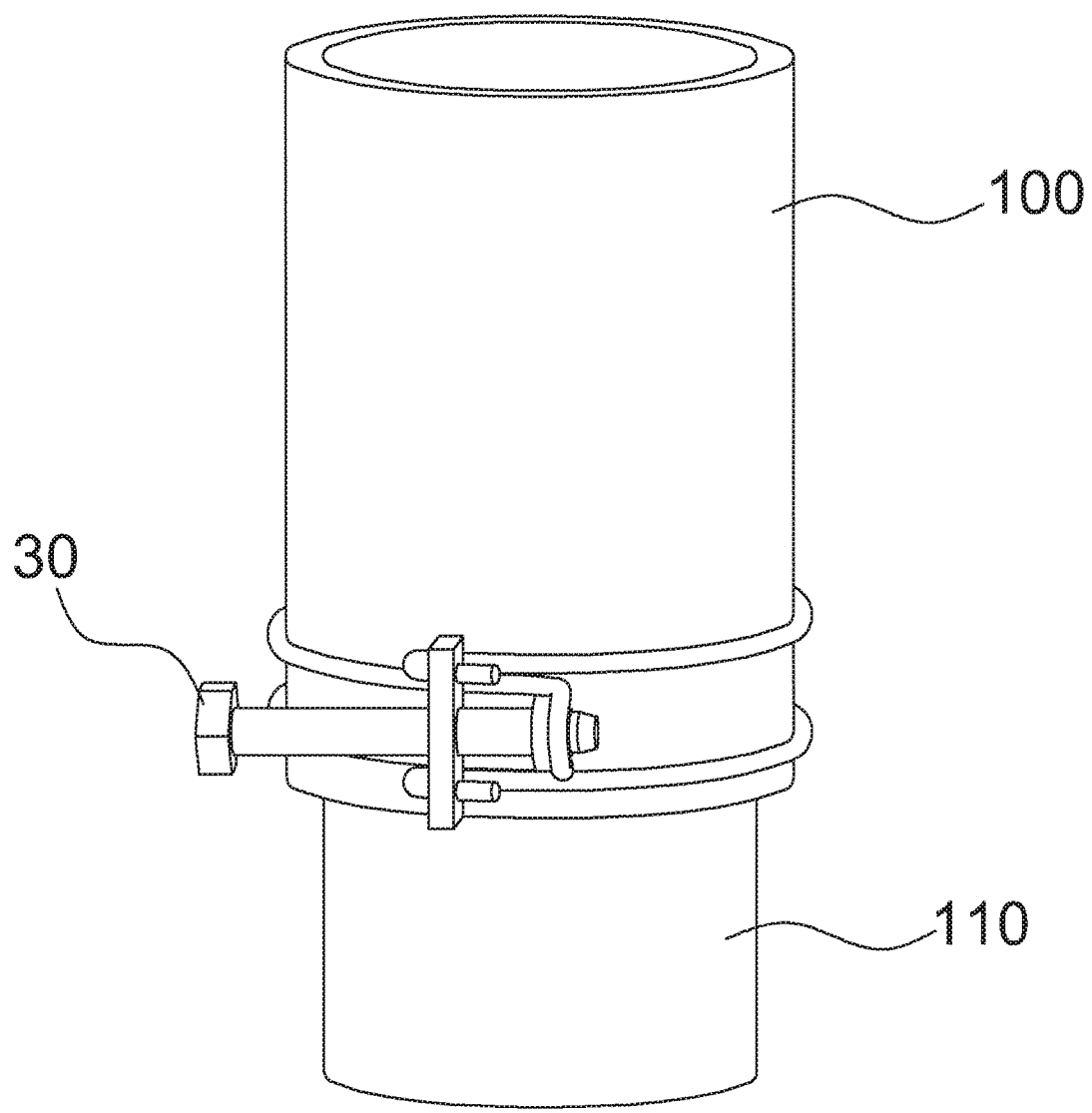
FIG. 2 is a view illustrating connection between a connection hose part and a humidifier port part in the humidifier for a fuel cell according to the first embodiment in the present disclosure.
Figure 3:
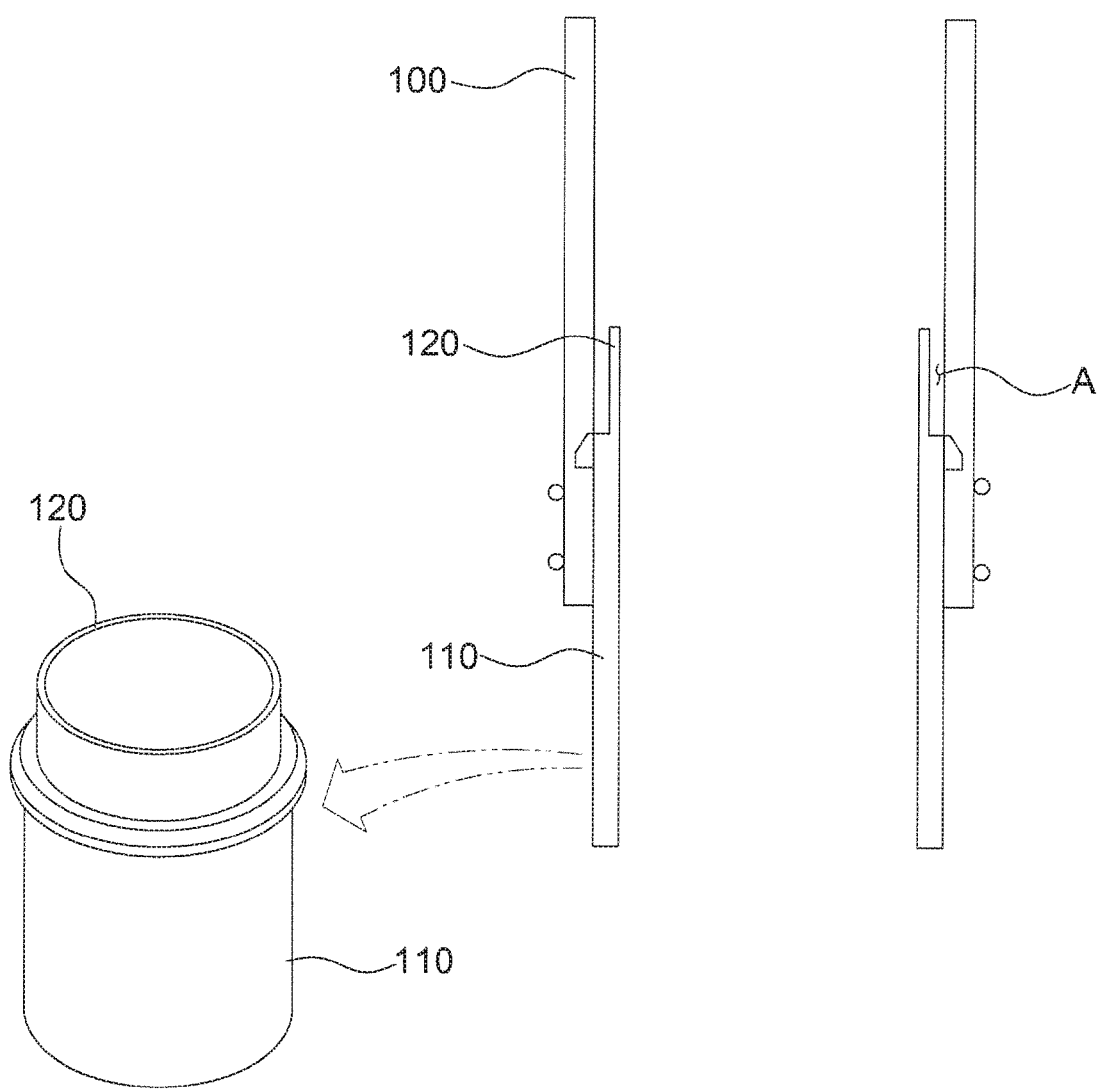
FIG. 3 is a view illustrating a condensate collection part of the humidifier for a fuel cell according to the first embodiment in the present disclosure.

FIG. 1 is a view schematically illustrating connection between a fuel cell stack and a humidifier for a fuel cell according to a first embodiment in the present disclosure. FIG. 2 is a view illustrating connection between a connection hose part and a humidifier port part in the humidifier for a fuel cell according to the first embodiment in the present disclosure. FIG. 3 is a view illustrating a condensate collection part of the humidifier for a fuel cell according to the first embodiment in the present disclosure.

As illustrated in FIGS. 1 to 3, the humidifier for a fuel cell includes a connection hose part 100, a humidifier port part 110, and a condensate collection part 120.

The connection hose part 100 is connected to an air inlet of a fuel cell stack 10. In some embodiments, the connection hose part 100 is made of a rubber material. The connection hose part 100 serves as a passage in which air humidified may move to the fuel cell stack 10 while passing through a humidifier housing 20.

The humidifier port part 110 is coupled to an inner peripheral surface of an end of the connection hose part 100, and connects the connection hose part 100 to an air outlet 20a of the humidifier housing 20. That is, the humidifier port part 110 is connected to the connection hose part 100 by clamping a hose clamp 30 on an outer peripheral surface of the connection hose part 100 as illustrated in FIG. 2, thereby connecting the humidifier housing 20 to the fuel cell stack 10.

When air is humidified by the humidifier and supplied to the fuel cell stack 10 in the state in which the humidifier port part 110 is connected to the connection hose part 100, vapor may be condensed due to a temperature difference between the humidified air and outside air. Since the humidifier housing 20 is located at a lower end of the fuel cell stack 10, the condensate flows into the humidifier housing 20 along wall surfaces of the connection hose part 100 and the humidifier port part 110 and is accumulated in the bottom of the humidifier housing 20.

Accordingly, if the condensate accumulated in the bottom of the humidifier housing 20 is temporarily supplied to the fuel cell stack 10 due to an increased amount of dry air supplied thereto, a passage in the fuel cell stack 10 may be clogged.

In addition, if the condensate accumulated in the humidifier housing 20 freezes due to a low temperature in the winter season, a humidification membrane in the humidifier housing 20 may be damaged due to the volume expansion of condensate.

Thus, the humidifier for a fuel cell according to the first embodiment includes the condensate collection part 120 to resolve the above problems.

Referring to FIG. 3, the condensate collection part 120 has a smaller outer diameter than the humidifier port part 110, and is coupled to an upper portion of the humidifier port part 110. Thus, a condensate collection space A is defined between an outer peripheral surface of the condensate collection part 120 and an inner peripheral surface of the connection hose part 100.

The condensate collection part 120 has a same inner diameter as the humidifier port part 110, and has a cylindrical shape in which the upper and lower 10$o$ portions thereof have the same diameter.

When the condensate collection part 120 is mounted to the humidifier port part 110 which is located in the connection hose part 100 with a predetermined length, the condensate collection part 120 has a stepped shape, thereby defining the condensate collection space A.

When condensate generated in the fuel cell stack 10 moves to the humidifier port part 110 along a wall surface of the connection hose part 100 in the humidifier of the first embodiment, the condensate is collected in the condensate collection space A defined by the condensate collection portion 120, thereby preventing the condensate from accumulating in the humidifier housing 20.

Figure 4:
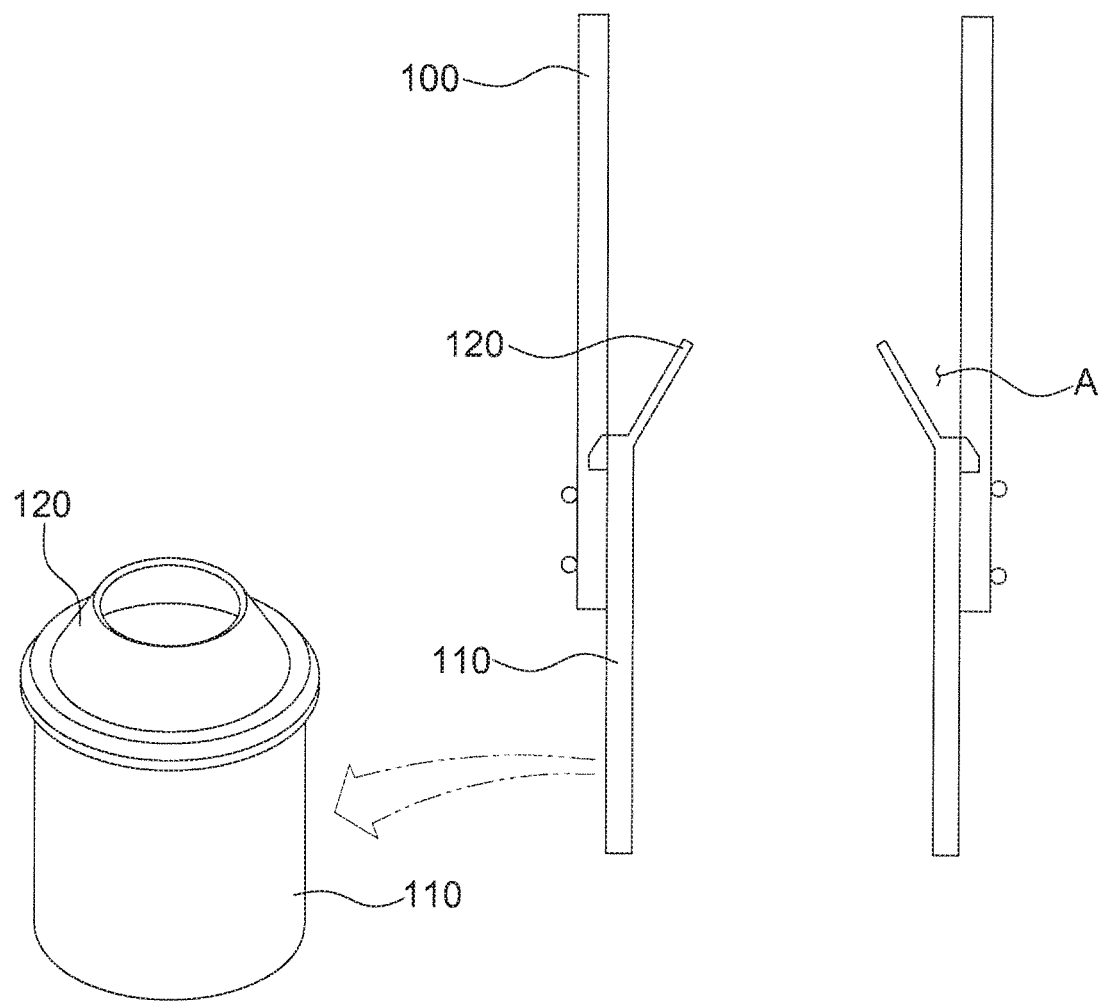
FIG. 4 is a view illustrating a condensate collection part of a humidifier for a fuel cell according to a second embodiment in the present disclosure.

FIG. 4 is a view illustrating a condensate collection part of a humidifier for a fuel cell according to a second embodiment in the present disclosure.

As illustrated in FIG. 4, a condensate collection part 120 may be inclined so that the area of a condensate collection space A gradually increases upward from a bottom of the condensate collection part 120.

That is, the condensate collection part 120 is coupled to an upper portion of a humidifier port part 110 while having a trapezoidal cross-section, and therefore, a distance between an inner peripheral surface of a connection hose part 100 and the outer peripheral surface of the condensate collection part 120 gradually increases upward from the bottom of the condensate collection part 120. Therefore, the area of the condensate collection space A may be increased.

Accordingly, a larger amount of condensate may be collected in the condensate collection space A compared to the condensate collection space A of the first embodiment, thereby more effectively preventing the condensate from accumulating in the humidifier housing 20 according to the second embodiment.

Figure 5:
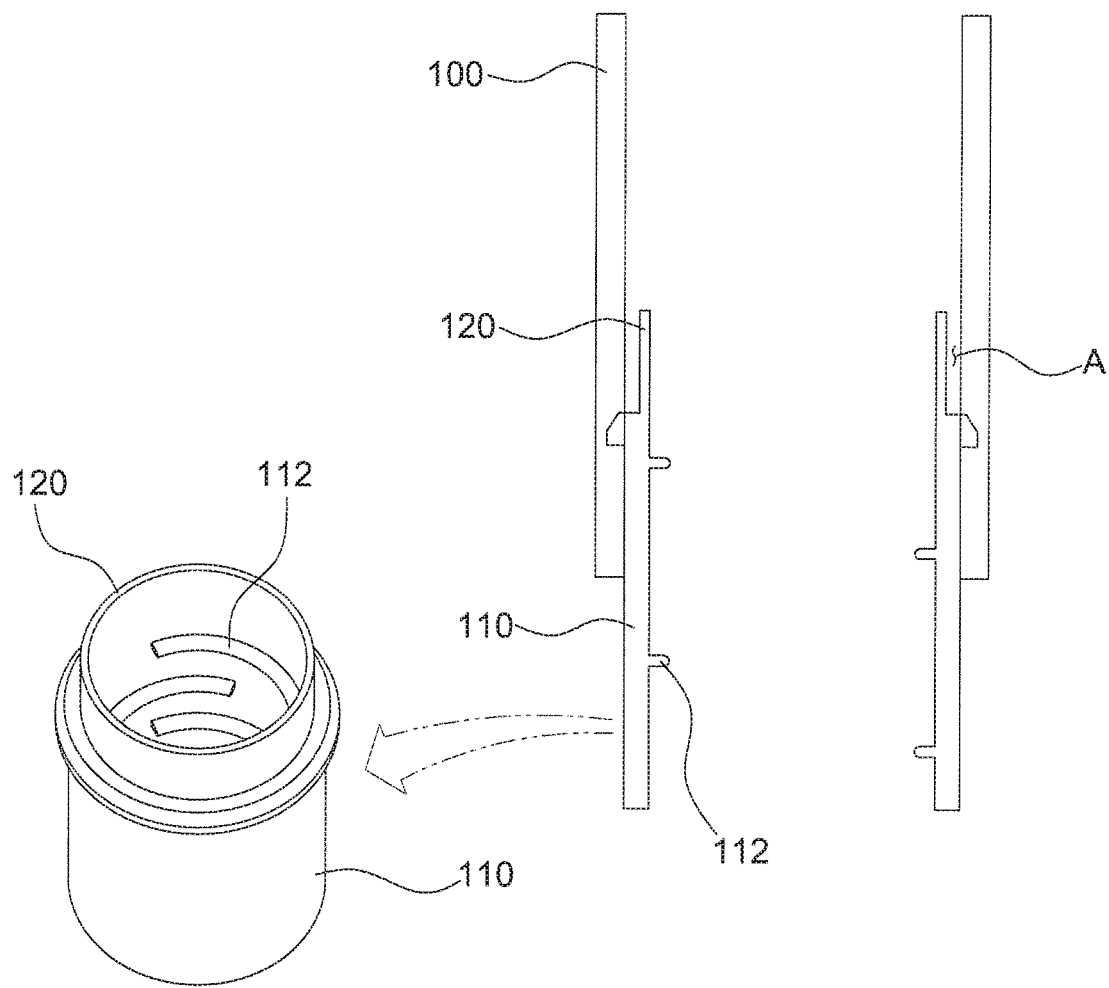
FIG. 5 is a view illustrating a humidifier port part of a humidifier for a fuel cell according to a third embodiment in the present disclosure.

FIG. 5 is a view illustrating a humidifier port part of a humidifier for a fuel cell according to a third embodiment in the present disclosure.

As illustrated in FIG. 5, a humidifier port part 110 has a plurality of catch members 112 which are formed on an inner peripheral surface thereof and are spaced apart from each other in a longitudinal direction thereof.

Each of the catch members 112 has different deflections at one side and another side in the humidifier port part 110, and has a predetermined length. In a certain embodiment, the catch members 112 are formed on the humidifier port part 110 to intersect with the catch members 112 adjacent thereto.

If condensate accumulated in a humidifier housing 20 is temporarily supplied to the fuel cell stack 10 due to an increased amount of dry air supplied thereto, the humidifier port part 110 may catch the condensate using the catch members 112 so that the condensate supplied to the fuel cell stack 10 is distributed.

Figure 6:
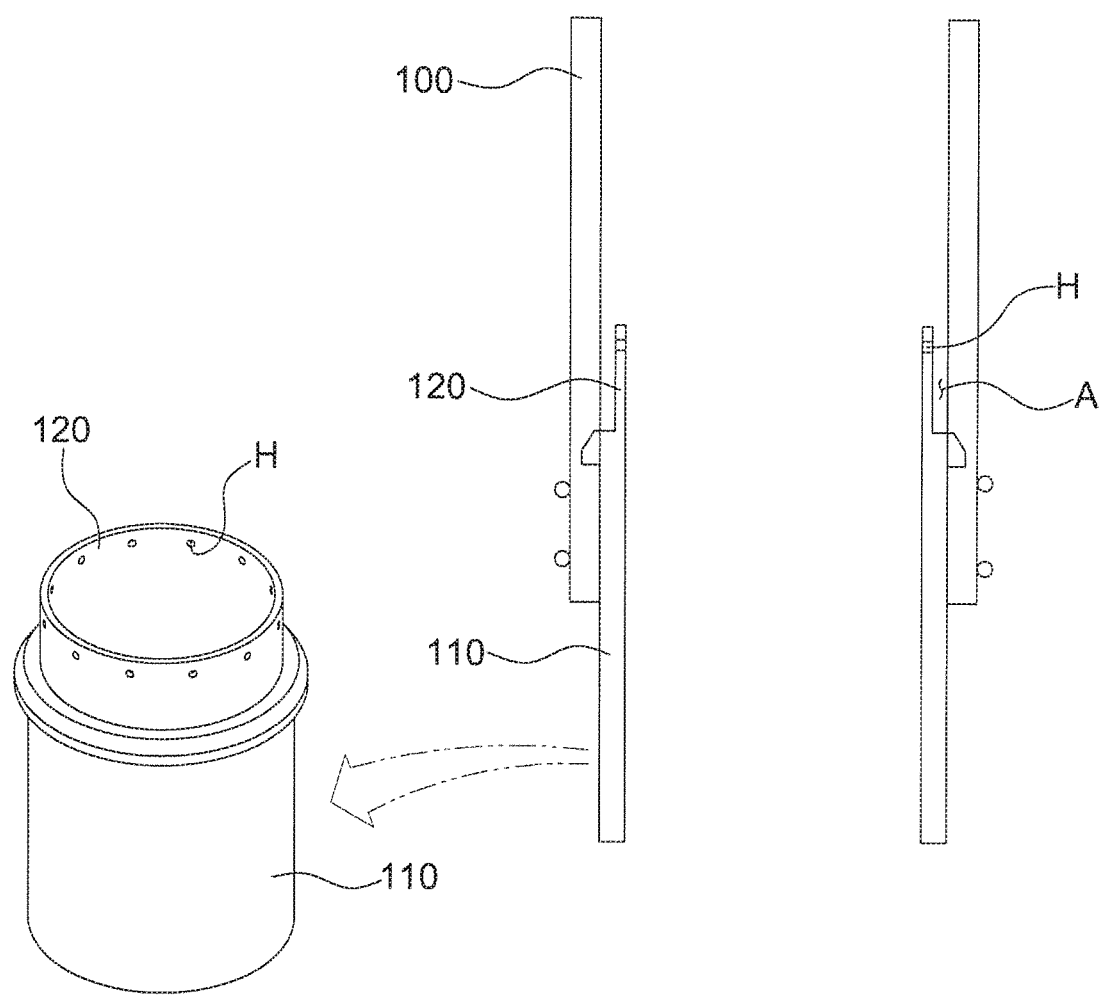
FIG. 6 is a view illustrating a condensate collection part of a humidifier for a fuel cell according to a fourth embodiment in the present disclosure.

FIG. 6 is a view illustrating a condensate collection part of a humidifier for a fuel cell according to a fourth embodiment in the present disclosure.

As illustrated in FIG. 6, a condensate collection part 120 may have a plurality of discharge holes H formed therethrough on an outer peripheral surface of an upper portion thereof.

Thus, when condensate is collected to a certain height or more in a condensate collection space A, the condensate may be slightly discharged from the condensate collection space A by the condensate collection part 120.

That is, when condensate is continually collected in the condensate collection space A in the state in which the condensate collection space A is filled with condensate, a large amount of condensate may move to a humidifier housing 20 along a wall surface of a humidifier port part 110 all at once to be accumulated in the humidifier housing 20.

In order to solve such a problem, the discharge holes H spaced apart from each other are formed at a predetermined height in the condensate collection part 120, so that the condensate collected in the condensate collection space A may be discharged through the discharge holes H.

Figure 7:
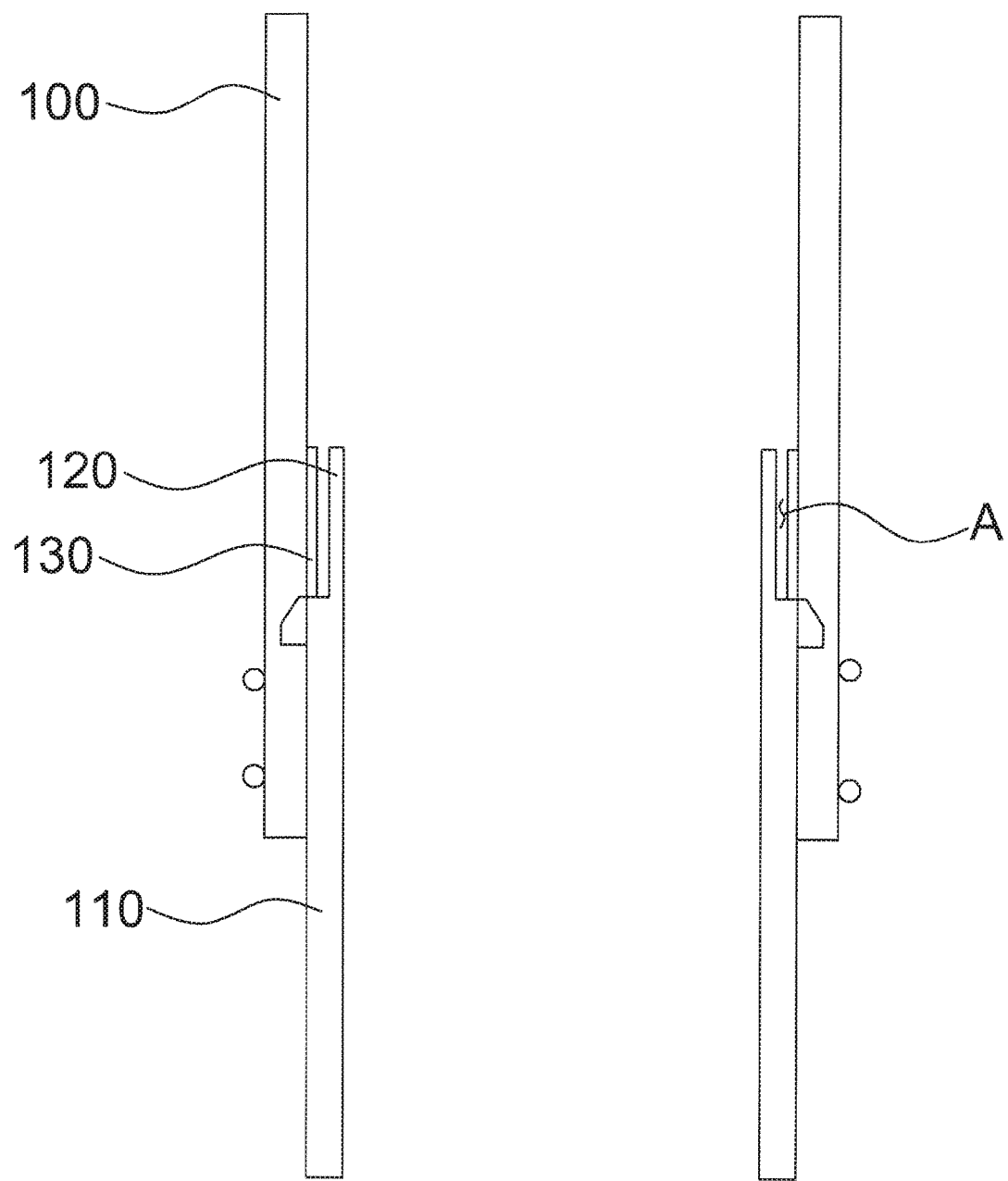
FIG. 7 is a view illustrating a condensate collection space of a humidifier for a fuel cell according to a fifth embodiment in the present disclosure.

FIG. 7 is a view illustrating a condensate collection space of a humidifier for a fuel cell according to a fifth embodiment in the present disclosure.

As illustrated in FIG. 7, a heat transfer member 130 may be formed on an inner peripheral surface of a connection hose part 100 in a condensate collection space A.

Here, the heat transfer member 130 has a plurality of pores. In a certain embodiment, the heat transfer member 130 is made of a metal foam or metal mesh which is metal having properties, such as lightweight, energy absorbing capacity, heat insulation, and fire resistance.

The heat transfer member 130 may be installed on the inner peripheral surface of the connection hose part 100 in the condensate collection space A, so as to evaporate condensate collected in the condensate collection space A.

The heat transfer member 130 may be coupled to each of the inner peripheral surface of the connection hose part 100 in the condensate collection space A and an outer peripheral surface of the condensate collection part 120. In a certain embodiment, the heat transfer member 130 may be selectively coupled to either the inner peripheral surface of the connection hose part 100 or the outer peripheral surface of the condensate collection part 120.

Figure 8:
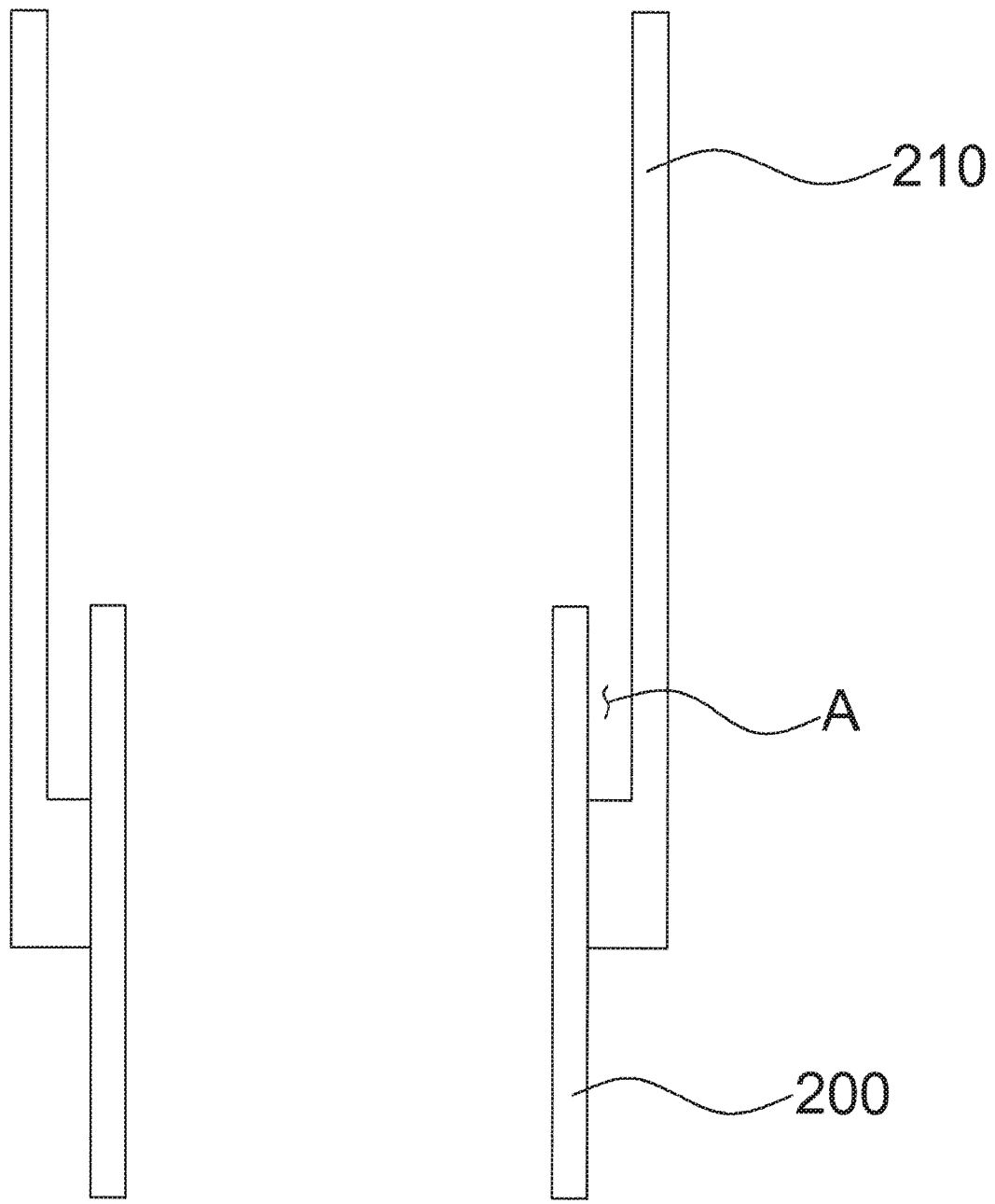
FIG. 8 is a view illustrating connection between a connection hose part and a humidifier port part in a humidifier for a fuel cell according to a sixth embodiment in the present disclosure.

FIG. 8 is a view illustrating connection between a connection hose part and a humidifier port part in a humidifier for a fuel cell according to a sixth embodiment in the present disclosure.

As illustrated in FIG. 8, the humidifier for a fuel cell according to the sixth embodiment includes a humidifier port part 200 and a connection hose part 210.

The humidifier port part 200 is connected to an air outlet 20a of a humidifier housing 20. Since the humidifier port part 200 is similar to those described in the above embodiments, a detailed description thereof will be omitted.

The connection hose part 210 is coupled to an outer peripheral surface of the humidifier port part 200, and connects the humidifier port part 200 to an air inlet of the fuel cell stack 10.

The connection hose part 210 has a bent end such that a condensate collection space A is defined between an inner peripheral surface of the bent end of the connection hose part 210 and the outer peripheral surface of the humidifier port part 200.

The bent end of the connection hose part 210 has an "L" shape such that each bent end faces each other when viewing in the cross-section of the connection hose part 210 as shown in FIG. 8. The area of the condensate collection space A may be adjusted according to a coupling position between the connection hose part 210 and the humidifier port part 200.

As such, the humidifier for a fuel cell according to the sixth embodiment defines the condensate collection space A, in which condensate is collected, by changing the shape of the bent end of the connection hose part 210, instead of including a separate condensate collection part as described above. Therefore, the structure for collecting condensate may be simplified.

Figure 9:
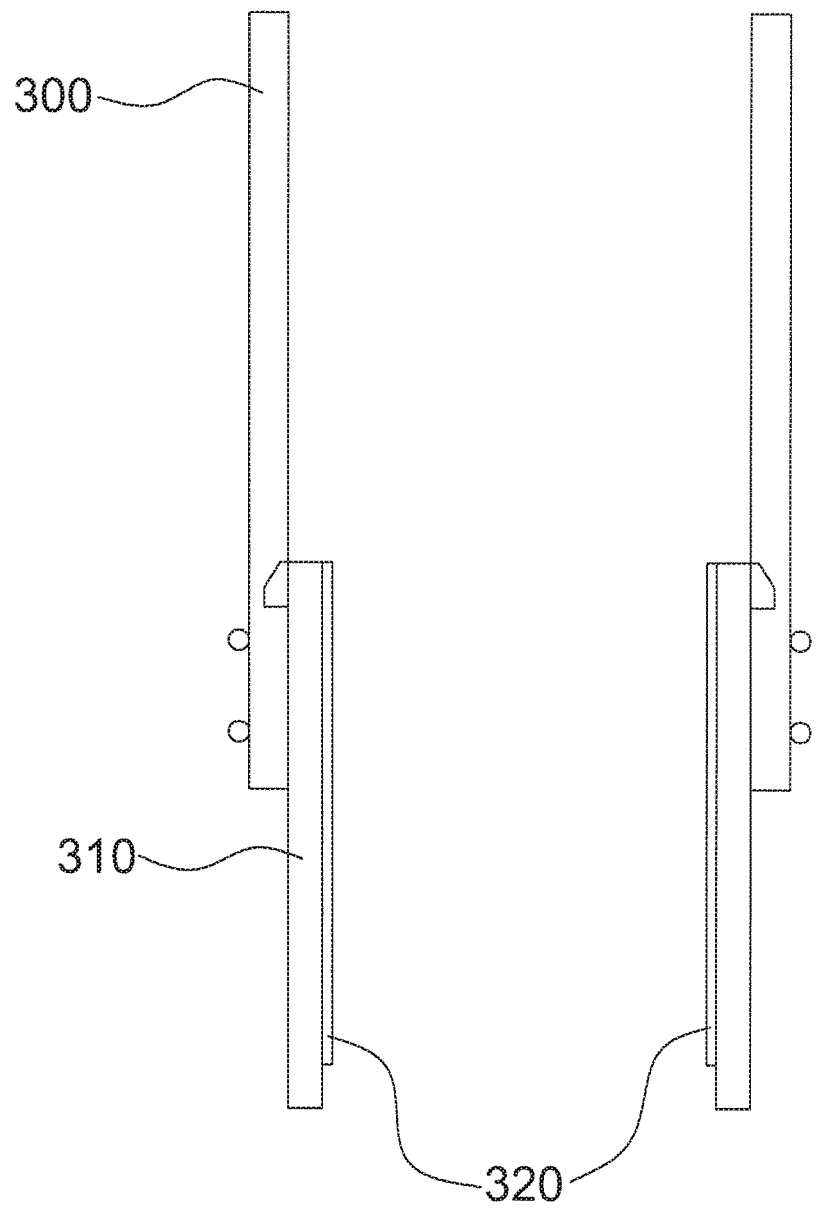
FIG. 9 is a view schematically illustrating a humidifier for a fuel cell according to a seventh embodiment in the present disclosure.
Figure 10:
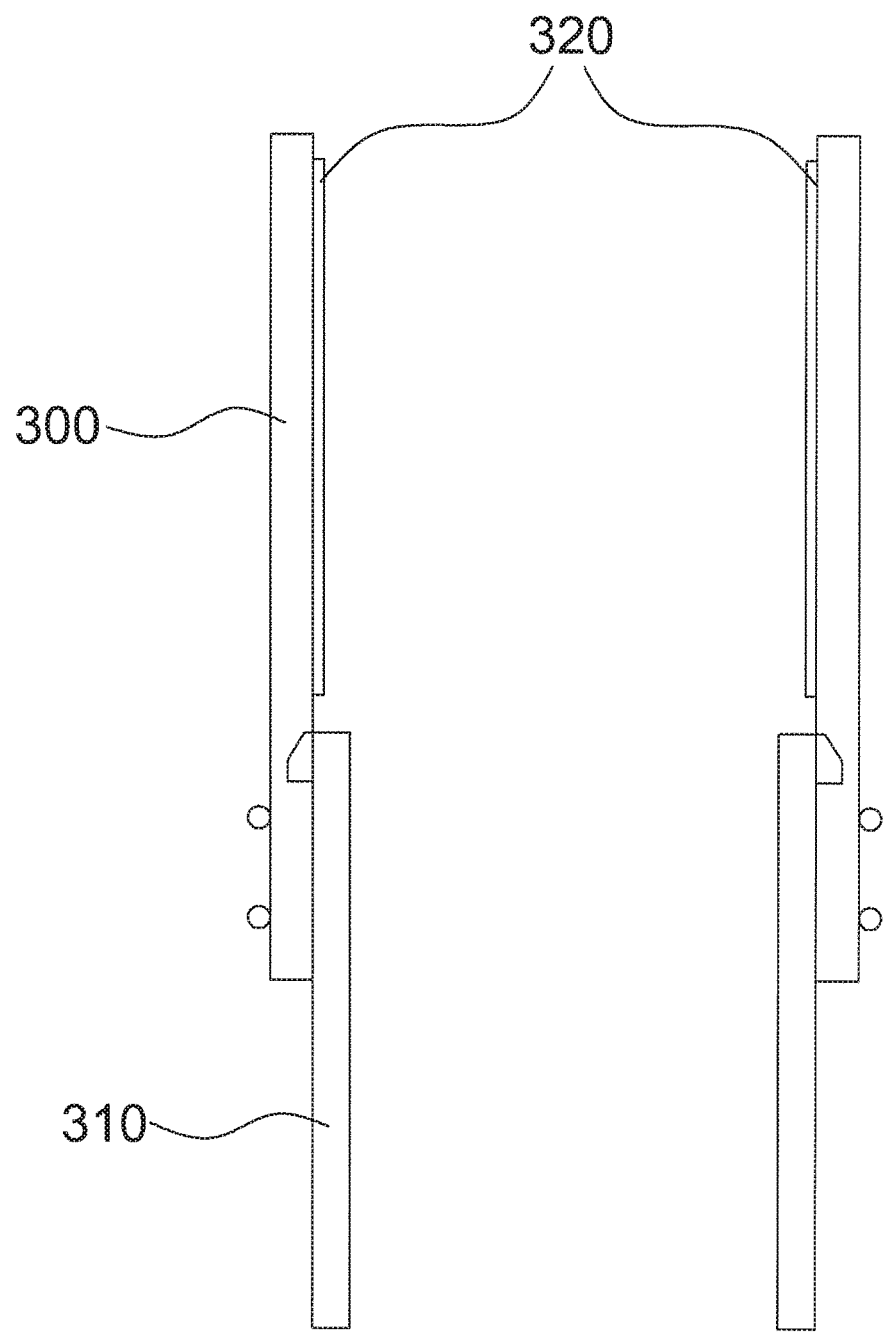
FIG. 10 is a view schematically illustrating a humidifier for a fuel cell according to an eighth embodiment in the present disclosure.

FIG. 9 is a view schematically illustrating a humidifier for a fuel cell according to a seventh embodiment in the present disclosure. FIG. 10 is a view schematically illustrating a humidifier for a fuel cell according to an eighth embodiment in the present disclosure.

As illustrated in FIG. 9, the humidifier for a fuel cell according to the seventh embodiment includes a connection hose part 300, a humidifier port part 310, and a heat transfer member 320.

Since the connection hose part 300 and the humidifier port part 310 are similar to those described in the above embodiments, a detailed description thereof will be omitted.

The heat transfer member 320 is coupled to an inner peripheral surface of the humidifier port part 310, and evaporates condensate moved along the inner peripheral surface of the humidifier port part 310.

The heat transfer member 320 has a plurality of pores. In a certain embodiment, the heat transfer member 320 is made of a metal foam or metal mesh which is metal having properties such as lightweight, energy absorbing capacity, heat insulation, and fire resistance.

The heat transfer member 320 may be coupled to the inner peripheral surface of the humidifier port part 310. Alternatively, the heat transfer member 320 may be coupled to an inner peripheral surface of the connection hose part 300, as illustrated in FIG. 10.

However, the coupling position of the heat transfer member 320 is an example, and the heat transfer member 320 may be coupled to each of the inner peripheral surfaces of the connection hose part 300 and the humidifier port part 310 in order to effectively evaporate condensate through heat transfer.

According to the present disclosure, the condensate collection space can be defined between the humidifier port and the connection hose, so that when air humidified by the humidifier is supplied to the fuel cell stack, condensate generated due to a temperature difference between the humidified air and outside air is collected in the condensate collection space.

In addition, since condensate is prevented from accumulating in the humidifier, it is possible to prevent a humidification membrane in the humidifier from being damaged due to volume expansion caused when the accumulated condensate freezes during the winter season.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A humidifier for a fuel cell, comprising:
    a connection hose part connected to an air inlet of a fuel cell stack;
    a humidifier port part coupled to an inner peripheral surface of the connection hose part, the humidifier port part connecting the connection hose part to an air outlet of a humidifier housing; and
    a condensate collection part coupled to an upper portion of the humidifier port part so that a condensate collection space is defined between an outer peripheral surface of the condensate collection part and the inner peripheral surface of the connection hose part.

2. The humidifier of claim 1, wherein the condensate collection part has a same inner diameter as the humidifier port part and has a cylindrical shape in which upper and lower portions of the condensate collection part have the same diameter.

3. The humidifier of claim 1, wherein the condensate collection part is inclined such that an area of the condensate collection space gradually increases upward from a bottom of the condensate collection part.

4. The humidifier of claim 1, wherein the humidifier port part has a catch member formed on an inner peripheral surface thereof.

5. The humidifier of claim 1, wherein the condensate collection part has a discharge hole formed therethrough.

6. The humidifier of claim 1, wherein the condensate collection space has a heat transfer member formed on the inner peripheral surface of the connection hose part.

7. The humidifier of claim 1, wherein the connection hose part is connected to the humidifier port part by clamping on an outer peripheral surface of the connection hose part.

8. A humidifier for a fuel cell, comprising:
    a humidifier port part connected to an air outlet of a humidifier housing; and
    a connection hose part coupled to an outer peripheral surface of the humidifier port part, connecting the humidifier port part to an air inlet of a fuel cell stack, and having a bent end such that a condensate collection space is defined between an inner peripheral surface of the connection hose part and the outer peripheral surface of the humidifier port part.

9. A humidifier for a fuel cell, comprising:
    a connection hose part connected to an air inlet of a fuel cell stack;
    a humidifier port part coupled to an inner peripheral surface of the connection hose part, the humidifier port part connecting the connection hose part to an air outlet of a humidifier housing; and
    a heat transfer member coupled to an inner peripheral surface of the humidifier port part to evaporate condensate which moves along the inner peripheral surface of the humidifier port part.

10. The humidifier of claim 9, wherein the heat transfer member is coupled to each of the inner peripheral surfaces of the connection hose part and the humidifier port part.

11. The humidifier of claim 9, wherein the heat transfer member is selectively coupled to the connection hose part or the humidifier port part.

* * * * *